United States Patent [19]

Frederiksen et al.

[11] 3,864,331

[45] *Feb. 4, 1975

[54] ACYLOXYMETHYL ESTERS OF α-AMINOPENICILLINS

[75] Inventors: Erling Knud Frederiksen, Holte; Wagn Ole Godtfredsen, Vaerlose, both of Denmark

[73] Assignee: Loven kemiske Fabrik Produktionsaktieselskab, Ballerup, Denmark

[ * ] Notice: The portion of the term of this patent subsequent to Oct. 20, 1989, has been disclaimed.

[22] Filed: Mar. 10, 1970

[21] Appl. No.: 18,355

[30] Foreign Application Priority Data
  Mar. 13, 1969  Great Britain .................... 13402/69
  July 18, 1969  Great Britain .................... 36407/69

[52] U.S. Cl. .............................. 260/239.1, 424/271
[51] Int. Cl. ........................................... C07d 99/16
[58] Field of Search ................................. 260/239.1

[56] References Cited
UNITED STATES PATENTS

| | | | |
|---|---|---|---|
| 2,985,648 | 5/1961 | Doyle et al. ..................... | 260/239.1 |
| 3,192,198 | 6/1965 | Nayler et al. ..................... | 260/239.1 |
| 3,250,679 | 5/1966 | Jansen et al. ..................... | 260/239.1 |
| 3,342,677 | 9/1967 | Cheney et al. .................... | 260/239.1 |
| 3,697,507 | 10/1972 | Frederiksen et al. ............ | 260/239.1 |

FOREIGN PATENTS OR APPLICATIONS

| | | | |
|---|---|---|---|
| 685,952 | 7/1969 | South Africa .................. | 260/243 C |
| 36,205 | 9/1968 | Greece ............................. | 260/239.1 |

OTHER PUBLICATIONS

Paehne et al., Journal of Medicinal Chemistry, Vol. 13, pages 607–612, (1970).

*Primary Examiner*—Nicholas S. Rizzo
*Attorney, Agent, or Firm*—Stowell & Stowell

[57] ABSTRACT

A group of new esters of α-amino-arylmethyl-penicillins and methods for their production are described and claimed, said esters having advantageous properties as regards adequate absorption and distribution in the organism. Intermediates in the production are also described and claimed.

2 Claims, No Drawings

ACYLOXYMETHYL ESTERS OF α-AMINOPENICILLINS

This invention relates to a group of new penicillin esters, and to methods of producing them.

In particular, the invention relates to a group of new esters of α-amino-arylmethyl-penicillins, the esters having the formulae:

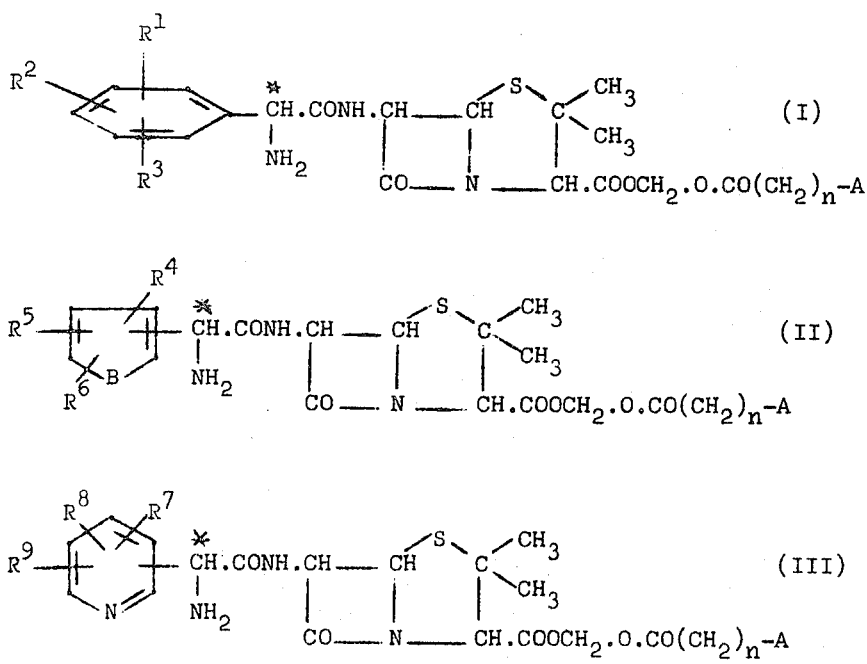

wherein the asterisk indicates an asymmetric carbon atom. In these formulae (I), (II), and (III) $R^1$ to $R^9$ are each a hydrogen or halogen atom, a trifluormethyl, nitro, amino, alkanoylamino, dialkylamino, alkanoyl, hydroxy, alkoxy, alkylthio, alkylsulphonyl or alkyl radical, or a cycloalkyl radical containing from 5 to 7 ring carbon atoms, a cycloalkoxy radical containing from 5 to 7 ring carbon atoms, or an aralkyl, aralkyloxy or aralkylthio radical; provided that in formula (I) at least one of the radicals $R^1$, $R^2$, and $R^3$ is other than a hydrogen atom, and $R^2$ together with either $R^1$ or $R^3$ can complete a carbocyclic ring; in formula (II) $R^5$ together with either $R^4$ or $R^6$ can complete a carbocyclic ring; in formula (III) $R^8$ together with either $R^7$ or $R^9$ can complete a carbocyclic ring; in formula (II) B stands for oxygen, sulphur, or NH. In the formulae (I), (II), and (III) $n$ is an integer from 0 to 5, and A is an unsubstituted or substituted aliphatic, alicyclic, aromatic, or heterocyclic radical. The invention also relates to salts of these penicillin esters with pharmaceutically acceptable acids, and to methods of preparing the esters and salts.

Due to the asymmetric carbon atom in the side chain of the compounds of formulae (I), (II), and (III), the present compounds exist in two epimeric forms, and the invention comprises both of the epimeric forms as well as mixtures thereof. The form in which the compounds are obtained depends on which of the epimeric starting materials and which methods are used to make the compounds. The mixtures of the epimeric forms may be separated by fractional crystallization or other known methods.

It is an object of the present invention to provide new penicillin esters having advantageous properties as regards adequate absorption, distribution in the organism, and the like factors.

When the esters of formulae (I), (II), and (III) are exposed to the influence of enzymes present in the body fluids, or enzymes produced by micro-organisms, e.g. pathogenic micro-organisms, they are readily hydrolysed to the corresponding free penicillin. This hydrolysis is an important feature in the use of the compounds of the invention. It is assumed that the first step consists in an enzymatic hydrolysis by non-specific esterases to give the corresponding hydroxymethyl esters which subsequently decompose spontaneously to the free penicillin.

It is known that many of the free penicillins corresponding to the esters of formula (I), (II), and (III) are insufficiently absorbed upon oral administration, and it is generally assumed that this inadequate absorption is due to the α-amino group attached to the side chain.

According to experiments carried out in connection with the present invention it has been demonstrated in animal tests, that, upon oral administration of the penicillin esters of formulae (I), (II), and (III), an extremely high concentration of the corresponding free penicillin is found in the blood and tissues due to efficient absorption combined with rapid hydrolysis in the organism. Thus, the present penicillin esters are considered particularly suited for oral administration in clinical therapy of patients suffering from infectious diseases, the successful treatment of which requires a high concentration of penicillin in the blood and tissues for a long period of time. In such cases, the desirable high concentration by means of the known penicillins is normally obtained by administration by the parenteral route which is inconvenient to the patient, if the treatment is prolonged, and impractical for the medical practitioner.

The compounds of formulae (I), (II), and (III) are well tolerated compounds which in clinical practice are preferably administered as such, or in the form of one of their salts, mixed with carriers and/or auxiliary agents and in any suitable form of pharmaceutical presentation for oral use.

In such compositions, the proportion of therapeutically active material to carrier substance and auxiliary agent can be between 1% and 95%. The compositions can either be worked up to pharmaceutical forms of presentation, such as tablets, pills or dragees, or they can be filled in medical containers, such as capsules, or as far as liquid compositions are concerned they can be filled into bottles. Pharmaceutical organic or inorganic solid or liquid carriers suitable for oral, enteral or topical administration can be used to make up the composition. Gelatine, lactose, starch, magnesium stearate, talc, vegetable and animal fats and oils, gums, polyalkylene glycol, and other known carriers for medicaments are all suitable as carriers. The preferred salt of the esters is the hydrochloride, but salts with other inorganic or organic acids including antibiotically active acids may be used, e.g. the hydrobromide, the hydroiodide, the sulphonate, the phosphate, the acetate, the tartrate, the maleate, the citrate, the benzoate, and the phenoxymethylpenicillinate. Furthermore, the compositions may contain other pharmaceutically active components which can appropriately be administered together with the ester in the treatment of infectious diseases, such as other suitable antibiotics.

In the preferred penicillins of formulae (I), (II), and (III), the alkyl radicals either as such or in combination, e.g. the alkylthio radicals, are lower-alkyl radicals including straight and branched aliphatic hydrocarbon chains with from 1 to 6 carbon atoms in the chain. In formulae (I), (II), and (III), A is preferably an aliphatic hydrocarbon radical in which the carbon chain can be straight or branched, saturated or unsaturated and has from 1 to 6 carbon atoms, such as methyl, ethyl, propyl, isopropyl, butyl, sec. and tert. butyl, pentyl, or hexyl; an alicyclic, carbocyclic radical having from 3 to 10 carbon atoms as ring members and in which the ring or rings may be saturated or may contain one or two double bonds depending on the number of carbon atoms, such as cyclopentyl, cyclohexyl, 1-adamantyl, 1-bicyclo[2,2,2]octyl, cyclopentenyl, or cyclohexenyl in which the double bond may be placed in the 2,3- or 3,4-position; an aromatic radical, such as a monocyclic carbocyclic aryl radical, e.g. phenyl or a substituted phenyl radical, a bicyclic carbocyclic aryl radical, e.g. 1- or 2-naphthyl, or a substituted naphthyl radical; a heterocyclic aryl radical, which may contain from 5 to 10 atoms as ring members, such as pyridyl, pyrazinyl, pyrimidyl, thienyl, furyl, or quinolyl, in which the hetero atom may be in any of the available positions, and which may further carry substituents in one or more of the remaining positions.

The radical A may, as already mentioned, have further substituents, such as lower alkyl, e.g. methyl, ethyl, propyl, isopropyl, or butyl; lower alkoxy, e.g. methoxy or ethoxy; lower alkylthio, e.g. methylmercapto or ethylmercapto; halo-lower alkyl, e.g. mono-, di- or trifluoromethyl, mono- di- or trichloromethyl, their ethyl homologues, or the corresponding bromo derivatives; halogen atoms, e.g. fluorine, bromine or chlorine; or nitro groups. The substituents may be placed in any of the possible positions.

According to observations in preliminary trials, the penicillin esters of formula (II) having a mono-nuclear hetero ring, and preferably containing sulphur as the hetero atom, in particular, possess the advantageous properties aforesaid and are supposed to be of special clinical value.

It is another object of the invention to provide a method of producing the compounds of formulae (I), (II), and (III). The method of the invention comprises a first step in which a compound of one of the formulae (IVa), (IVb), and (IVc):

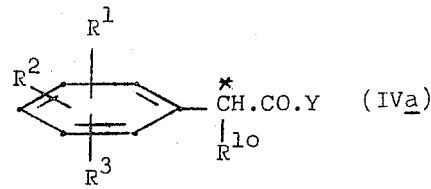

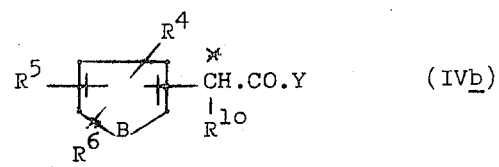

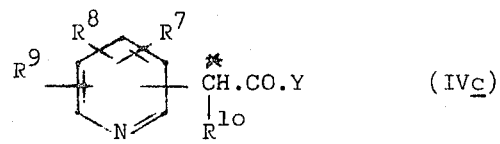

wherein $R^1$ to $R^9$ and B are as hereinbefore defined, and $R^{10}$ is an amino group or a substituted amino group (Z—NH—), or a radical which can be converted into an amino group, such azido, nitro, or halogen, is reacted with an ester of 6-aminopenicillanic acid of formula (V)

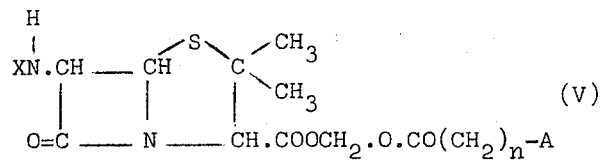

$n$ and A having the meanings hereinbefore defined, and —CO—Y and X—NH— defining radicals capable of reacting with each other to form a —CO—NH bridge, whereafter, if $R^{10}$ stands for an amino group, the desired penicillin ester is recovered, or, if $R^{10}$ is not an amino group, the radical $R^{10}$ of the penicillin ester formed as an intermediate is, in a second step, converted into a free amino group in a manner known per se, and the desired penicillin ester is recovered.

The starting compounds of formulae (IVa), (IVb), and (IVc) are known compounds which can be prepared by standard methods known e.g. from peptide chemistry.

The radical —CO—Y of these starting substances can, for instance, be the radical of an acid halide, such as an acid chloride or bromide; of an anhydride; of a mixed anhydride with an alkyl-carbonic acid, such as isobutyl-carbonic acid, or of a carboxylic acid, an inorganic acid or a sulphonic acid; or a radical obtained by reacting the corresponding free acid with a carbodiimide or N,N'-carbonyl-diimidazole or a similarly functioning compound; X in formula (V) above can be a hydrogen atom or a trialkylsilyl radical, the alkyl radicals of which each have maximum 5 carbon atoms.

The first step of the present method can be performed in an organic solvent or in a mixture thereof with water either at a low temperature or at a slightly elevated temperature. Suitable solvents are methylene chloride, chloroform, ethyl acetate, acetone, dimethylformamide, dimethylacetamide, ether, tetrahydrofuran, dioxane, and similar inert solvents. The reaction product is isolated in conventional amnner, e.g. by reprecipitation or by removal of the solvent followed by recrystallization from a solvent.

The substituent $R^{10}$ of the starting substances of formulae (IV)a, b, and c, if not an amino group, is selected from groups which, after the first step of the method has been performed, are capable of being converted into an amino group in a second step by means of methods mild enough to avoid cleavage of the molecule at the ester group or at the lactam ring. In particular, the substituent $R^{10}$ may have the formula Z—NH—, where Z is a benzyloxycarbonyl radical, a p-halo-, p-nitro-, or p-methoxy-benzyloxycarbonyl radical, a $\beta,\beta,\beta$-trichloro-ethoxycarbonyl, or an allyloxycarbonyl radical; or where Z is a sulphur-containing radical, such as a tritylsulphenyl radical or an arylsulphenyl radical, e.g. an o-nitrophenylsulphenyl radical. Z may also be a triphenylmethyl (also called trityl) radical, a tertiary butoxycarbonyl radical, or a radical obtained by reacting the free amino group with a $\beta$-dicarbonyl compound, such as acetylacetone, an acetoacetic ester, or benzoylacetone, to form an enamine or Schiff base. In general, any group represented by Z, which can be split off by reduction, by mild acid hydrolysis, or by other mild reactions known per se, will be suitable, since experiments have shown that the esters of formulae (I), (II), and (III) formed by the reaction in question are stable under such conditions. Examples of $R^{10}$ groups which can be converted into an amino group include the azido group, the nitro group and halogen atoms, such as the bromine atom.

In the case where one or more of the radicals $R^1$ to $R^9$ is a free hydroxy group or a free amino group, these groups can be protected during the reaction, if desired, in the same way as $R^{10}$ or by other known methods, e.g. by etherification or alkylation.

In the second step of the present method, catalytic hydrogenation will be preferred when $R^{10}$ represents Z—NH—, wherein Z stands for benzyloxycarbonyl or related derivatives thereof, or for trityl. This hydrogenation is preferably performed at room temperature and at atmospheric or slightly elevated pressure in a non-reducible organic solvent or a mixture thereof with water. The preferred catalysts are noble metal catalysts, such as palladium or platinum, or Raney-nickel, but other catalysts can be used as well. Electrolytic reduction can also be used in these cases. When Z stands for a $\beta,\beta,\beta$-trichloroethyloxycarbonyl radical, a reduction with zinc in acetic acid is preferred. When Z stands for a sulphur-containing radical, an enamine, or a Schiff base, a mild acid hydrolysis is preferred, for instance at a pH of about 2 in a dilute solution of hydrogen chloride in aqueous acetone. A treatment with formic acid at room temperature is especially suitable for the removal of Z, when Z is a tertiary butoxycarbonyl radical. Also known from the literature is the removal of the o-nitrophenylsulphenyl radical involving a nucleophilic attack on the sulphur atom of the sulphenamide group, the best yield in the present case being obtained with sodium or potassium iodide, sodium thiosulphate, sodium hydrogen sulphide, sodium dithionite or potassium thiocyanate. Other sulphenamide radicals can be split in the same way. If $R^{10}$ is an azido or nitro group, or a halogen atom, especially a bromine atom, these groups may be transformed into the free amino group in known manner, the azido and the nitro group by catalytic hydrogenation, using a noble metal or Raney-nickel as catalyst, or by electrolytic reduction, and the halogen atom by an amination, for instance with hexamethylenetetramine.

The starting substances of formula (V) can be prepared by the treatment of 6-amino-penicillanic acid in the form of a salt, such as an alkali metal salt or the triethylammonium salt, with a halomethyl ester of the formula $R^{11}$—$CH_2$—$OCO(CH_2)_n$—A in which $R^{11}$ is a halogen atom, preferably a chlorine or bromine atom, or a sulphonyloxy radical, such as methanesulphonyloxy or toluenesulphonyloxy radical, and n and A are as defined hereinbefore. The 6-amino-penicillanic acid may be used as such, or the 6-amino group may be protected during the esterification process. Only protecting radicals, which are easily removed without causing any cleavage of the lactam ring or the ester group, are suitable in this case, as for instance the triphenylmethyl and trimethylsilyl radical. The reaction is performed in an inert organic solvent, such as acetone, dimethylformamide or methylene chloride, and at or below room temperature or at a slightly elevated temperature. When the amino group has been protected, the removal of the protecting group can be performed by methods, such as hydrogenation or hydrolysis under neutral or acidic conditions, in which the $\beta$-lactam ring and the ester group are not attacked. The reaction products of formula (V) (X=H) are conveniently isolated as their acid addition salts with for instance p-toluenesulphonic acid or other inorganic or organic acid, such as sulphuric, phosphoric, hydrochloric, acetic, maleic, or tartaric acid.

In another embodiment, the compounds of formula (V) can be prepared by esterification of any of the industrially accessible penicillins or preferably their salts with a compound of the aforementioned formula $R^{11}$—$CH_2$—$OCO(CH_2)_n$—A under conditions similar to those already described, whereafter the side chain of the resulting penicillin ester is split off to yield the 6-amino-penicillanic ester of formula (V) or a salt thereof.

The cleavage of the amide bond can be performed by a modification of the procedure described in the specification of Belgian Patent No. 698,596 by reacting the 6-acylamino-penicillanic acid ester with an acid halide in the presence of an acid-binding agent, such as quinoline or pyridine. The preferred acid halide is, however, phosphorous pentachloride, because in this case the reaction can be performed at low temperature, thereby increasing the stability of the intermediate formed which presumably is an imino halide. The reaction can be performed in various solvents, but the preferred solvents are chloroform and methylene chloride.

The intermediate is not isolated, but is treated with an excess of a primary alcohol to form an imino ether. The reaction temperature and the reaction time depend on the alcohol used; in most cases a temperature between −20°C and +20°C will be convenient.

The imino ether is not isolated, but is subjected to an acid alcoholysis or hydrolysis, cleaving the C=N bond to yield the corresponding 6-amino-penicillanic ester of formula (V). It is surprising that the lactam ring and the acyloxymethyl ester grouping are sufficiently stable under these conditions. The ester of 6-amino-penicillanic acid can be isolated from the reaction mixture as such or in the form of a salt with an inorganic or organic acid, such as the hydrochloride or the tosylate, by conventional methods.

The penicillin esters formed in the first step of the method having one of the following formulae (VIa), (VIb), and (VIc) ($R^{10}$ ≠ $NH_2$):

wherein $R^1$ to $R^{10}$, $n$, and A have the meanings hereinbefore defined, represent interesting intermediates in the synthesis of the present compounds, which intermediates are also new compounds constituting as such a part of this invention. These intermediates can also be prepared by reacting an α-$R^{10}$-substituted penicillin derivative of one of the formulae (VIIa), (VIIb), and (VIIc):

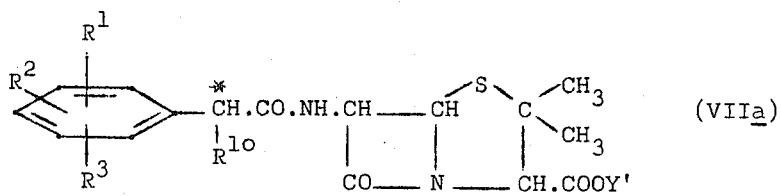

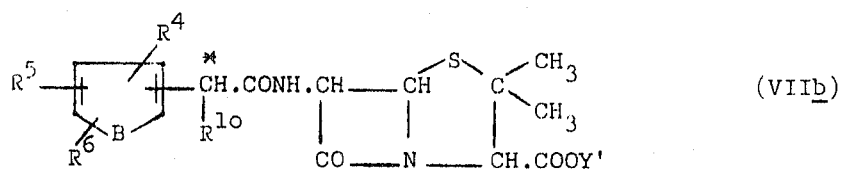

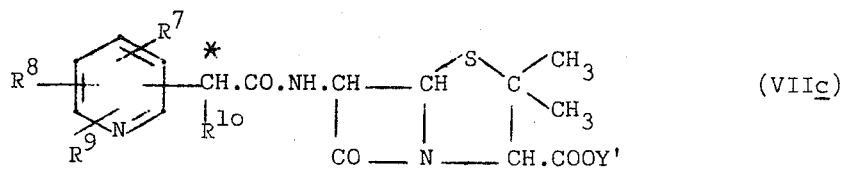

in which formulae $R^1$ to $R^{10}$ have the above defined meanings, and Y' is hydrogen or a cation, such as an alkali metal or a tertiary ammonium group, with a compound of formula (VIII):

(VIII)

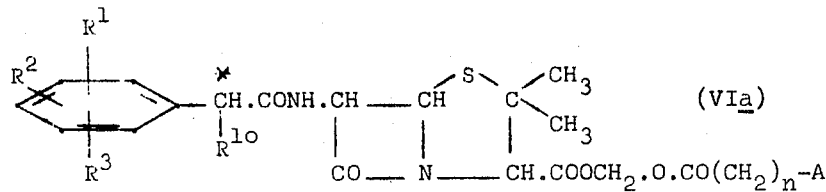

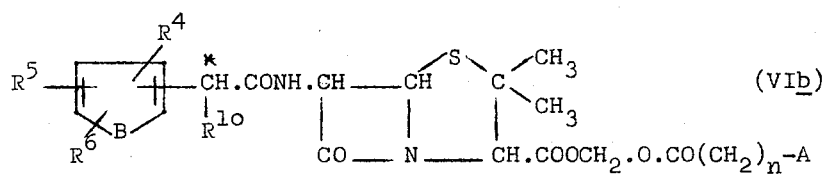

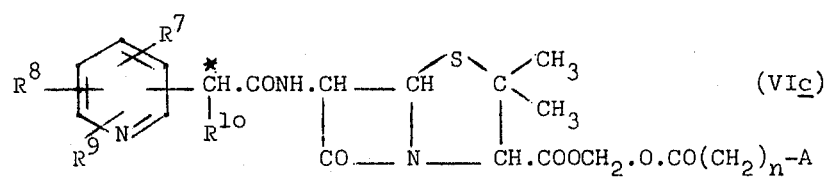

in which n and A are as defined hereinbefore, and X' is a halogen atom, preferably chlorine or bromine, an acyloxy radical having from 1 to 16 carbon atoms, or an alkylsulphonyloxy or arylsulphonyloxy radical. The compounds formed by the reaction are esters of $\beta$-$R^{10}$-substituted penicillins of one of the formulae (VIa), (VIb), and (VIc). When $R^{10}$ is $NH_2$, the formulae (VIa), (VIb), and (VIc) represent the compounds of the invention, whereas, when $R^{10}$ has the other meanings defined above, the formulae (VIa), (VIb), and (VIc) represent the intermediates mentioned hereinbefore.

The starting compounds of the formulae (VIIa), (VIIb), and (VIIc), in which $R^{10}$ is different from $NH_2$, are known as intermediates in the synthesis of $\alpha$-amino-arylmethylpenicillins. They exist in two epimeric forms. If the starting compounds are prepared in the form of the D or the L epimers, the corresponding epimeric form of the compounds of the invention will be obtained. If, on the other hand, a mixture of the epimeric forms of the starting compound is used, a mixture is obtained. This mixture can be separated in the individual epimers, for instance by fractional crystallization.

The methods of preparing the starting substances of formulae (VIIa), (VIIb), and (VIIc) are standard procedures and include, for instance, a reaction between a reactive derivative of a compound of formulae (IVa), (IVb), or (IVc) and 6-amino-penicillanic acid in which the amino group may be free or substituted, for instance, with a trimethylsilyl radical.

The starting compounds of formula (VIII) are known compounds which can be prepared by methods which are standard procedures for this type of compounds.

Among such methods may be mentioned the reaction of an acid halide with paraformaldehyde (as described in e.g. J.A.C.S 43, 660 (1921)), or the halogenation of methyl esters (as described in e.g. Acta Chem. Scand. 20, 1273 (1966) and references cited there).

The reaction of the compounds of the formulae (VIIa), (VIIb), and (VIIc) with the compounds of formula (VIII) can be performed at or below room temperature or by gentle heating up to the boiling point of the solvent, depending on the meaning of Y' and X'. Different organic solvents or mixtures thereof with water may be used, for example acetone, dioxane, tetrahydrofuran, methylene chloride, or dimethylformamide. The reaction products are crystalline or oily products, which cna be used in the next step without further purification. By repeated reprecipitations, the oily products can be obtained as crystalline or amorphous powders.

The subsequent reaction step (VI → I), in which the $R^{10}$ group is converted into an amino group, is as described above.

The invention will now be illustrated by the following non-limiting Examples.

EXAMPLE 1

Pivaloyloxymethyl 6-aminopenicillanate a. From 6-aminopenicillanic acid (6-APA)

To a suspension of 6-APA (0.25 mole) in dimethylformamide (DMF) (250 ml) were added triethylamine ($Et_3N$) (0.35 mole) and, after stirring for 0.5 hours, chloromethyl pivalate (0.5 mole). After stirring at 26°–28°C for 4 hours the mixture was diluted with ethyl acetate (EtOAc) (750 ml); the precipitate of $Et_3N$, HCl which formed was filtered off, and the filtrate was washed with $H_2O$ (4 × 250 ml) to remove the greater part of DMF and unreacted 6-APA. The organic layer was dried and concentrated to about half the volume under reduced pressure (bath-temperature 35°C). Treatment of the stirred solution of the crude ester with 0.5 M p-toluenesulphonic acid (p-TsOH) in EtOAc (450 ml) at 25°C precipitated the crystalline p-toluenesulfonate which was filtered off, washed with EtOAc followed by ether, and dried to yield 101.2 g 80.6%) of colourless needles, m.p. 148°–149°C (dec.). Recrystallization from methanol-EtOAc furnished the analytical sample, m.p. 150°–151°C (dec.), $[\alpha]_D$ + 133° (Methanol). IR (KBr) 1795 ($\beta$-lactam) and 1765 $cm^{-1}$ (ester); nmr ($CDCl_3$) 1.17 (s, 9 H, $C(CH_3)_3$), 1.38 and 1.44 (2 s, 6 H, $C(CH_3)_2$), 4.45 (s, 1 H, CH-3), 4.98 and 5.40 (2 d, J=4 cps, 2H, CH-5 and CH-6), 5.72 and 5.83 ppm (AB q, J=5.5 cps, 2 H, $OCH_2O$). analysis:

| | |
|---|---|
| Calculated for $C_{21}H_{30}N_2O_8S_2$: | C 50.18, H 6.01, N 5.57, S 12.76 |
| Found: | C 50.08, H 6.03, N 5.53, S 12.82 |

A crystalline hydrochloride, m.p. 156°–160°C. (dec.), $[\alpha]_D$ + 183° (0.1 N HCl) was obtained by adding 1N HCl in isopropanol to a stirred solution of crude 6-APA pivaloyloxymethyl ester in EtOAc. Analysis:

| | |
|---|---|
| Calculated for $C_{14}H_{23}Cl\ N_2O_5S$ | : C 45.84, H 6.32, Cl 9.66<br>N 7.63, S 8.74 |
| Found | : C 45.60, H 6.39, Cl 9.76,<br>N 7.54, S 8.83. | b. From pivaloyloxymethyl benzylpenicillinate

To a solution of $PCl_5$ (0.16 mole) in dry, alcohol-free $CHCl_3$ (320 ml) was added quinoline (0.31 mole) with stirring. The solution was cooled to −10°C, and pivaloyloxymethyl benzylpenicillinate (0.14 mole) was added. After stirring for 15 minutes at −10°C propanol (105 ml) was added at 5°–10°C during 5 minutes. The temperature was kept at −10°C for a further 15 minutes, and then a solution of NaCl (50 g) in $H_2O$ (220 ml) was added with vigorous stirring. During this process the temperature rose to 0°C. After addition of light petroleum (450 ml) the solution was seeded with crystals from an earlier preparation, and after stirring for 10 minutes a further 500 ml of light petroleum was added during 5–10 minutes. Stirring was continued for 15 minutes at 0°C after which the aqueous phase was separated, and the precipitate in the organic phase was collected. The filter cake was suspended in a mixture of saturated aqueous NaCl (200 ml) and $H_2O$ (10 ml); the suspension was filtered, and the filter cake was washed with saturated aqueous NaCl followed by ether to yield 52.4 g (89%) of the hydrochloride of the desired compound, $[\alpha]_D$ + 161° (0.1 N HCl). Apart from a content of NaCl the product was pure and could be used for the acylation step without further purification.

Analogous to the preparation of pivaloyloxymethyl 6-aminopenicillanate (method a) the following acyloxymethyl esters of 6-APA were prepared from 6-APA and the corresponding chloromethyl esters:

Acetoxymethyl 6-aminopenicillanate - Obtained as a crystalline p-toluenesulfonate, m.p. 147°–148°C (dec.), $[\alpha]_D + 133°$ (methanol). Analysis:

Calculated for $C_{18}H_{24}N_2O_8S_2$ : C 46.95, H 5.25, N 6.08, S 13.92
Found : C 46.84, H 5.17, N 5.86, S 13.79.

Propionyloxymethyl 6-aminopenicillanate - Obtained as a crystalline p-toluenesulfonate, m.p. 135°–136°C (dec.), $[\alpha]_D + 128°$ (methanol). Analysis:

Calculated for $C_{19}H_{26}N_2O_8S_2$ : C 48.09, H 5.52, N 5.90, S 13.51
Found : C 48.03, H 5.70, N 5.84, S 13.53.

iso-Butyryloxymethyl 6-aminopenicillanate - Obtained as a crystalline p-toluenesulfonate, m.p. 132°–133°C (dec.), $[\alpha]_D + 133°$ (methanol). Analysis:

Calculated for $C_{20}H_{28}N_2O_8S_2$ : C 49.16, H 5.78, N 5.73, S 13.13
Found : C 49.39, H 5.81, N 5.59, S 12.96.

Valeryloxymethyl 6-aminopenicillanate - Obtained as a crystalline p-toluenesulfonate, m.p. 131°–132°C (dec.), $[\alpha]_D + 126°$ (methanol). Analysis:

Calculated for $C_{21}H_{30}N_2O_8S_2$ : C 50.18, H 6.01, N 5.57, S 12.76
Found : C 50.20, H 6.06, N 5.44, S 12,78

α-Ethyl-n-butyryloxymethyl 6-aminopenicillanate - Obtained as a crystalline p-toluenesulfonate, m.p. 139°–140°C (dec.), $[\alpha]_D + 123°$ (methanol). Analysis:

Calculated for $C_{22}H_{32}N_2O_8S_2$ : C 51.14, H 6.24, N 5.42, S 12.41
Found : C 51.09, H 6.18, N 5.49, S 12.46.

Benzoyloxymethyl 6-aminopenicillanate - Obtained as a crystalline p-toluenesulfonate, m.p. 143°–144°C (dec.), $[\alpha]_D + 121°$ (methanol). Analysis:

Calculated for $C_{23}H_{26}N_2O_8S_2$ : C 52.86, H 5.02, N 5.36, S 12.27
Found : C 52.50, H 5.04, N 5.29, S 12.41.

EXAMPLE 2

Pivaloyloxymethyl α-amino-p-chlorobenzylpenicillinate hydrochloride

To a suspension of α-(p-chlorophenyl)-glycyl chloride hydrochloride (2.43 mmole) in $CH_2Cl_2$ (100 ml) solid $NaHCO_3$ (5.12 mmole) followed by pivaloyloxymethyl 6-aminopenicillanate hydrochloride (2.0 mmole) was added with stirring at 0°C. After vigorous stirring at 0°C for 1½ hours, the mixture was filtered through celite, and isopropanol (30 ml) was added to the filtrate which then was concentrated in vacuo to remove $CH_2Cl_2$. During this process crystallization began. After addition of isopropanol (30 ml) and ether (70 ml), the mixture was cooled and filtered to yield 8.5 g of the desired compound.

By substituting
α-(o-fluorophenyl)-glycyl chloride hydrochloride,
α-(p-methoxyphenyl)-glycyl chloride hydrochloride,
α-(m-trifluoromethylphenyl)-glycyl chloride hydrochloride,
α-(p-methylphenyl)-glycyl chloride hydrochloride,
α-(p-bromophenyl)-glycyl chloride hydrochloride,
α-(m-chlorophenyl)-glycine chloride hydrochloride,
α-(o-chlorophenyl)-glycine chloride hydrochloride,
α-(2,4-dichlorophenyl)-glycine chloride hydrochloride,
α-(o-methoxyphenyl)-glycine chloride hydrochloride,
α-(o-nitrophenyl)-glycyl chloride hydrochloride,
α-(1-naphthyl)-glycyl chloride hydrochloride,
α-(2-naphthyl)-glycyl chloride hydrochloride,
α-(5-ethyl-2-thienyl)-glycine chloride hydrochloride,
α-(5-methyl-2-thienyl)-glycine chloride hydrochloride,
α-(5-t-butyl-2-thienyl)-glycine chloride hydrochloride, and
α-(2,5-dimethyl-3-thienyl)-glycine chloride hydrochloride, respectively, for the α-(p-chlorophenyl)-glycyl chloride hydrochloride, the following penicillin esters were obtained:

Pivaloyloxymethyl α-amino-o-fluorobenzylpenicillinate,
Pivaloyloxymethyl α-amino-p-methoxybenzylpenicillinate,
Pivaloyloxymethyl α-amino-m-trifluoromethylbenzylpenicillinate,
Pivaloyloxymethyl α-amino-p-methylbenzylpenicillinate,
Pivaloyloxymethyl α-amino-p-bromobenzylpenicillinate,
Pivaloyloxymethyl α-amino-m-chlorobenzylpenicillinate,
Pivaloyloxymethyl α-amino-o-chlorobenzylpenicillinate,
Pivaloyloxymethyl α-amino-2,4-dichlorobenzylpenicillinate,
Pivaloyloxymethyl α-amino-o-methoxybenzylpenicillinate,
Pivaloyloxymethyl α-amino-o-nitrobenzylpenicillinate,
Pivaloyloxymethyl α-amino-(1-naphthylmethyl)-penicillinate,
Pivaloyloxymethyl α-amino-(2-naphthylmethyl)-penicillinate,
Pivaloyloxymethyl α-amino-(5-ethyl-2-thienylmethyl)-penicillinate,
Pivaloyloxymethyl α-amino-(5-methyl-2-thienylmethyl)-penicillinate,
Pivaloyloxymethyl α-amino-(5-t-butyl-2-thienylmethyl)-penicillinate, and
Pivaloyloxymethyl α-amino-(2,5-dimethyl-3-thienylmethyl)-penicillinate, respectively, all in the form of hydrochlorides.

EXAMPLE 3

Acetoxymethyl 6-[(-)-α-amino(3-thienyl)acetamido]-penicillanate hydrochloride

To a suspension of (-)-α-(3-thienyl)-glycylchloride hydrochloride (2.43 mmole) in 100 ml of methylene chloride at 0°C solid sodium bicarbonate (4.3 g) followed by acetoxymethyl 6-aminopenicillanate hydrochloride (2.0 mmole) was added. After stirring at 0°C for 2 hours, the mixture was filtered through "Celite", and isopropanol (30 ml) was added to the filtrate which was subsequently concentrated in vacuo to remove methylene chloride. The addition of ether (100 ml) precipitated the desired compound as a colourless amorphous powder easily soluble in water.

EXAMPLE 4

Benzoyloxymethyl 6-[α-amino(2-thienyl)acetamido]-penicillanate hydrochloride

Benzoyloxymethyl 6-aminopenicillanate, hydrochloride (7.8 g) was suspended with vigorous stirring in dry ethanol-free chloroform (100 ml) at 0°C. Sodium bicarbonate (4.3 g) was added, followed by D,L-α-(2-thienyl)-glycyl chloride, hydrochloride (5.0 g) prepared in the manner described in the specification of U.S. Pat. No. 3,342,677.

Stirring was maintained for 3 hours at 0°C. The mixture was filtered through diatomaceous earth, and the clear filtrate was evaporated in vacuo. The colourless residue was re-precipitated from isopropanol/ether, collected on a filter, and washed with isopropanol and ether to yield the desired compound.

EXAMPLE 5

Pivaloyloxymethyl α-amino-m-hydroxybenzylpenicillinate hydrochloride

To a solution of sodium N-[1-methyl-2-carbomethoxyvinyl]-D-α-amino-m-hydroxyphenylacetate (163 g) (prepared as described in the specification of U.S. Pat. No. 3,316,247) in ethyl acetate (2 litres) N-methylmorpholine (2.5 ml) and isobutyl chloroformate (70 ml) were added at −15°C while stirring. Sodium chloride separated immediately, and the mixture was kept at −15°C for 6 minutes. Then an ice-cold solution of pivaloyloxymethyl 6-aminopenicillanate in ethyl acetate (1 litre) - prepared from 251.3 g of the crystalline p-toluenesulphonate of this compound - was added while stirring, the temperature being kept between −14°C and −12°C during the acylation. After stirring for another 10 minutes at low temperature, the cooling bath was removed, and the mixture stirred at room temperature for 30 minutes. Thereafter, the mixture was extracted with 0.5 M aqueous sodium bicarbonate (500 ml), and washed with water (2 × 250 ml). The organic phase was dried, and the solvent was removed in vacuo. The yellow oily residue thus obtained was dissolved in acetone (1 litre); water (0.9 litre) was added, and 4N hydrochloric acid was added drop by drop to the mixture while stirring vigorously. A pH-value of 2.5 was maintained in the mixture during the hydrolysis by using an automatic titrator. The reaction was finished when the consumption of hydrochloric acid ceased after addition of 100–110 ml (80–88 per cent of the theoretical amount). Acetone was removed from the mixture by evaporation in vacuo (bath-temperature about 35°C), and the remaining aqueous phase was extracted several times with ethyl acetate. After separation of the aqueous layer, the combined ethyl acetate extracts were diluted with petroleum ether (800 ml) and extracted with water (pH 3; 200 ml). To the combined aqueous phases (about 1.2 litres), sodium chloride (240 g) was added, and the mixture was shaken vigorously whereafter a yellowish organic layer was separated. The aqueous phase was further extracted with ethyl acetate (200 ml); the combined organic phases were dried over magnesium sulphate and filtered, whereafter isopropanol (800 ml) was added to the filtrate. After concentration of the solution under reduced pressure to about half the volume (bath-temperature about 35°C), another 800 ml of isopropanol were added, and the mixture was concentrated in vacuo to about 600–800 ml. The mixture was stirred for 1 hour at room temperature and was kept in the refrigerator overnight. The precipitated material was filtered off, washed with ice-cold isopropanol (100 ml), and ether (2 × 100 ml), and dried at room temperature to yield the desired compound.

EXAMPLE 6

Pivaloyloxymethyl α-amino-p-hydroxybenzylpenicillinate

To a solution of O,N-dibenzyloxycarbonyl-p-hydroxy-D,L-α-aminophenylacetic acid (4.36 g) and triethylamine (1.42 ml) in ethyl acetate (60 ml) was added isobutyl chloroformate (1.4 ml) at −5°C while stirring. Triethylamine hydrochloride separated immediately, and the mixture was kept at −5°C for 4 minutes. Then an ice-cold solution of pivaloyloxymethyl 6-aminopenicillanate in ethyl acetate (40 ml), prepared from 5.02 g of the crystalline p-toluenesulphonate of this compound, was added while stirring, the temperature being kept between −5°C and 0°C during the acylation. After stirring for 10 minutes at 0°C, and then for a further 30 minutes without external cooling, the mixture was extracted with aqueous 0.5 M sodium bicarbonate (2 × 10 ml), and washed with water until neutral. The solution of pivaloyloxymethyl 6-(O,N-dibenzyloxycarbonyl-p-hydroxy-D,L-α-aminophenylacetamido-penicillanate in ethyl acetate (about 100 ml) thus obtained was placed in a four-necked 500 ml flask equipped with an efficient stirrer, a gas inlet tube, a gas outlet tube, a glass-calomel combination electrode, and a burette controlled by an automatic titrator. Water (100 ml) and 10% palladium on carbon catalyst (5 g) were added, and the system was flushed with nitrogen. Then, a stream of hydrogen was bubbled through the suspension while stirring, a pH-value of 2.5 being maintained in the aqueous phase by the addition of 0.5 N hydrochloric acid via the automatic titrator. When the consumption of acid had stopped, the flask was flushed with nitrogen until all of the hydrogen was removed. The catalyst was filtered off, and the aqueous phase was separated from the filtrate. To the organic layer were added ether (100 ml) and water (100 ml), the pH-value in the aqueous phase was adjusted to 2.5 by adding 0.5N hydrochloric acid while stirring, and the aqueous layer was separated. The combined aqueous phases were washed with ether and freeze-dried to yield 3.2 g of the hydrochloride of the desired compound as a colourless amorphous product with a purity of 82%.

By substituting:
N-benzyloxycarbonyl-α-amino-(3-pyridyl)-acetic acid,
N-benzyloxycarbonyl-α-amino-(3-pyridyl)-acetic acid,
N-benzyloxycarbonyl-α-amino-(2-pyrrolyl)-acetic acid,
respectively for the above O,N-dibenzyloxycarbonyl-p-hydroxy-α-aminophenylacetic acid, the following penicillin esters were obtained: f
Pivaloyloxymethyl 6-[α-amino-(3-pyridyl)-acetamido] penicillanate,
Pivaloyloxymethyl 6-[α-amino-(4-pyridyl)-acetamido] penicillanate,
Pivaloyloxymethyl 6-[α-amino-(2-pyrrolyl)-acetamido] penicillanate, respectively, all in the form of their hydrochlorides.

EXAMPLE 7

Pivaloyloxymethyl α-amino-m-chloro-o-hydroxybenzylpenicillinate

A solution of α-benzyloxycarbonylamino-m-chloro-p-hydroxyphenylacetic acid (3.36 g) and triethylamine (1.42 ml) in ethyl acetate (60 ml) was cooled to −10°C. Isobutyl chloroformate (1.4 ml) was added while stirring, and the mixture was kept at −10°C for 4 minutes. Then, an ice-cold solution of pivaloyloxymethyl 6-amino-penicillanate in ethyl acetate (40 ml), prepared from 5.02 g of the crystalline p-toluenesulphonate of this compound, was added to the suspension while stirring, the temperature being kept between −10°C and −5°C during the addition. After stirring for a further 10 minutes at low temperature and then for 30 minutes without external cooling, the mixture was extracted with aqueous 0.5 M sodium bicarbonate (2 × 10 ml), and washed with water until neutral. To the resulting solution of pivaloyloxymethyl α-benzylsoxycarbonylamino-m-chloro-p-hydroxybenzylpenicillinate in ethyl acetate, water (100 ml) and 10% palladium on carbon catalyst were added, and the mixture was hydrogenated in the same way as described in Example 1. When the reaction was finished, the catalyst was filtered off, the aqueous phase was separated, and the organic layer was re-extracted with water (pH 2.5). The combined aqueous phases were washed with ether and freeze-dried to yield the hydrochloride of the desired compound as a colourless amorphous powder, which had a purity of 80.5%.

EXAMPLE 8

Pivaloyloxymethyl α-amino-m-aminobenzylpenicillinate

Isobutyl chloroformate (1.4 ml) was added to a solution of α-benzyloxycarbonylamino-m-benzyloxycarbonylaminophenylacetic acid (4.34 g) and triethylamine (1.42 ml) in ethyl acetate (80 ml) at −10°C while stirring. Triethylamine hydrochloride separated immediately, and the mixture was kept at −10°C for 4 minutes. To the solution of the mixed anhydride thus obtained, an ice-cold solution of pivaloyloxymethyl 6-aminopenicillanate in ethyl acetate (40 ml), prepared from 5.02 g of the crystalline p-toluenesulphonate of this compound, was added while stirring. During the acylation, and then for a further 10 minutes, the temperature in the reaction mixture was kept between −10°C and −5°C. Thereafter, the mixture was stirred for 30 minutes without external cooling, extracted with aqueous 0.5 M sodium bicarbonate (2 × 15 ml), and washed with water until neutral. To the solution of pivaloyloxymethyl α-benzyloxycarbonylamino-m-benzyloxycarbonylaminobenzylpenicillinate in ethyl acetate thus obtained were added water (120 ml) and 10% palladium on carbon catalyst (7.5 g), and the mixture was hydrogenated in the same way as described in Example 1. When the hydrogenation was finished, the catalyst was filtered off, and the aqueous phase was separated. After re-extraction of the organic layer with water (pH 2.5), the combined aqueous phases were washed with ether and freeze-dried to give the dihydrochloride of the desired compound as a yellowish amorphous powder. The purity of the product was 76%.

EXAMPLE 9

Pivaloyloxymethyl 6-[α-amino-(3-thienyl)-acetamido] penicillanate, hydrochloride A solution of pivaloyloxymethyl 6-aminopenicillanate in ethyl acetate (100 ml) was prepared from 5.02 g of the p-toluenesulphonate of this compound. To this solution were added water (2 ml), solid sodium bicarbonate (1.26 g), and α-azido-(3-thienyl)-acetyl chloride (2.03 g) at 0°–5°C while stirring. After stirring for 1 hour at the low temperature the cooling-bath was removed and stirring continued until the temperature had risen to 20°C (about 30 minutes). Then, the mixture was filtered, and the filtrate was washed with 0.5 M aqueous sodium bicarbonate (2 × 10 ml) and water until neutral. To the solution of the crude pivaloyloxymethyl 6-[α-azido-(3-thienyl)-acetamido] penicillanate thus obtained were added water (100 ml) and 10% palladium on carbon catalyst (6 g), and the mixture was hydrogenated in the same way as described in Example 6. When the reaction was finished, the catalyst was filtered off and washed with ethyl acetate followed by water (pH 2.5 ). From the combined filtrate and washings, the aqueous phase was separated, and the organic layer was extracted with water (pH 2.5, 100 ml). The combined aqueous phases were washed with ether (40 ml) and freeze-dried to yield the hydrochloride of pivaloyloxymethyl 6-[α-amino-(3-thienyl)-acetamido]-penicillanate as a slightly yellowish amorphous powder, which had a purity of 82%.

EXAMPLE 10

Acetoxymethyl 6-[α-amino-(3-thienyl)-acetamido] penicillanate, hydrobromide

To a stirred solution of crude 6-[α-azido-(3-thienyl)-acetamido] penicillanic acid (7.63 g) (prepared as described in the specification of S. Afr. Patent No. 63/1715) in dimethyl formamide (80 ml) were added triethylamine (2.8 ml), solid sodium bicarbonate (1.68 g), and bromomethyl acetate (3.0 ml). The reaction mixture was stirred for 3 hours at room temperature, diluted with ethyl acetate (320 ml), and washed with water (4 × 80 ml) to remove unreacted starting material and the greater part of dimethyl formamide. Then, the remaining solution of crude acetoxymethyl 6-α-azido-(3-thienyl)-acetamido] penicillanate in ethyl acetate was concentrated in vacuo to a volume of about 100 ml. Water (100 ml) and 10% palladium on carbon catalyst (10 g) were added, and the mixture was hydrogenated in a similar way as described in Example 6. To maintain a pH of 2.5 in the aqueous phase during the hydrogenation, 1N hydrobromic acid was used. When the reaction was finished, the catalyst was filtered off, the aqueous phase was separated, and the organic layer re-extracted with water (pH 2.5, 100 ml). The combined aqueous phases were washed with ether (40 ml) and freeze-dried to give the desired compound as a yellowish amorphous powder, which had a purity of 84%.

What we claim is:

1. A compound of the formula

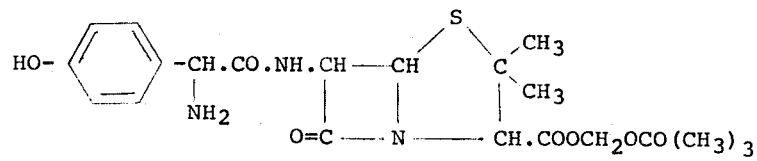

and pharmaceutically acceptable salts thereof.

2. A compound as claimed in claim 1 having the D configuration.

* * * * *

UNITED STATES PATENT OFFICE
CERTIFICATE OF CORRECTION

PATENT NO. : 3,864,331
DATED : February 4, 1975
INVENTOR(S) : Erling Knud Frederiksen & Wagn Ole Godtfredsen It is certified that error appears in the above-identified patent and that said Letters Patent are hereby corrected as shown below:

Page 1 (cover page), the assignee should read
--L$\emptyset$ven$\underline{s}$ kemiske Fabrik Produktionsaktieselskab--.

Page 1 (cover page), under "OTHER PUBLICATIONS",
"Paehne et al" should be corrected to read
--$\underline{D}$aehne et al--.

Column 7, line 42, "(VI$\underline{b}$), and (VI$\underline{c}$) ($R^{10} \neq NH_2$):"
is repetitious and should be cancelled.

Signed and sealed this 27th day of May 1975.

(SEAL)
Attest:

RUTH C. MASON
Attesting Officer

C. MARSHALL DANN
Commissioner of Patents
and Trademarks